United States Patent
Le et al.

(10) Patent No.: US 10,956,414 B2
(45) Date of Patent: *Mar. 23, 2021

(54) ENTITY BASED QUERY FILTERING

(71) Applicant: Microsoft Technology Licensing, LLC, Redmond, WA (US)

(72) Inventors: Benjamin Hoan Le, San Jose, CA (US); Dhruv Arya, Sunnyvale, CA (US); Ganesh Venkataraman, San Jose, CA (US); Shakti Dhirendraji Sinha, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 287 days.

This patent is subject to a terminal disclaimer.

(21) Appl. No.: 16/058,548

(22) Filed: Aug. 8, 2018

(65) Prior Publication Data

US 2018/0349440 A1    Dec. 6, 2018

Related U.S. Application Data

(63) Continuation of application No. 15/251,614, filed on Aug. 30, 2016, now Pat. No. 10,055,457.

(51) Int. Cl.
*G06F 17/00* (2019.01)
*G06F 16/2453* (2019.01)
(Continued)

(52) U.S. Cl.
CPC .... *G06F 16/24534* (2019.01); *G06F 16/9024* (2019.01); *G06Q 50/01* (2013.01)

(58) Field of Classification Search
CPC .......... G06F 16/24534; G06F 16/9024; G06F 16/9027; G06Q 50/01
See application file for complete search history.

(56) References Cited

U.S. PATENT DOCUMENTS

| 7,877,389 B2 | 1/2011 | Klinkner et al. |
| 8,010,547 B2 | 8/2011 | Peng et al. |

(Continued)

OTHER PUBLICATIONS

"U.S. Appl. No. 15/251,614, Notice of Allowance dated Jun. 11, 2018", 9 pgs.

(Continued)

*Primary Examiner* — Greta L Robinson
(74) *Attorney, Agent, or Firm* — Schwegman Lundberg & Woessner, P.A.

(57) ABSTRACT

In an example embodiment, one or more query terms are obtained. For each of the one or more query terms, a standardized entity taxonomy is searched to locate a standardized entity that most closely matches the query term. A confidence score is calculated for the query term-standardized entity pair for the standardized entity that most closely matches the query term. In response to a determination that the confidence score transgresses a threshold, the query term is associated with an entity identification corresponding to the standardized entity that most closely matches the query term. One or more query rewriting rules corresponding to an entity type of the standardized entity having the entity identification are obtained. The one or more query rewriting rules are executed to rewrite the first query such that the rewritten query, when performed on a data source, returns fewer search results than the first query would have.

20 Claims, 8 Drawing Sheets

(51) Int. Cl.
*G06F 16/901* (2019.01)
*G06Q 50/00* (2012.01)

(56) References Cited

U.S. PATENT DOCUMENTS

| | | | |
|---|---|---|---|
| 8,756,241 | B1 | 6/2014 | Thite et al. |
| 9,727,607 | B2 * | 8/2017 | Kumar ............... G06F 16/24565 |
| 10,055,457 | B2 * | 8/2018 | Le ....................... G06F 16/9024 |
| 10,148,777 | B2 * | 12/2018 | Arya ...................... G06N 20/00 |
| 10,331,752 | B2 * | 6/2019 | Bentley ............... G06F 16/9535 |
| 2010/0191758 | A1 | 7/2010 | Peng et al. |
| 2016/0098438 | A1 | 4/2016 | Eberlein et al. |
| 2016/0140233 | A1 | 5/2016 | Kumar et al. |
| 2017/0337202 | A1 | 11/2017 | Arya et al. |
| 2018/0060387 | A1 | 3/2018 | Le et al. |

OTHER PUBLICATIONS

"U.S. Appl. No. 15/251,614, PTO Response to Rule 312 Communication dated Jul. 18, 2018", 2 pgs.

* cited by examiner

ENTITY BASED QUERY FILTERING

CROSS-REFERENCE TO RELATED APPLICATIONS

This application is a continuation of prior application Ser. No. 15/251,614, filed on Aug. 30, 2016, which is incorporated by reference herein in its entirety.

TECHNICAL FIELD

The present disclosure generally relates to computer technology for solving technical challenges in search queries to data sources. More specifically, the present disclosure relates to entity based query filtering.

BACKGROUND

The rise of the Internet has occasioned two disparate phenomena: the increase in the presence of social networks, with their corresponding member profiles visible to large numbers of people, and the increase in use of social networks for job searches, both by applicants and by employers. Employers, or at least recruiters attempting to connect applicants and employers, often perform searches on social networks to identify candidates who have qualifications that make them good candidates for whatever job opening they are attempting to fill. The employers or recruiters then can contact these candidates to see if they are interested in applying for the job opening.

Traditional querying of social networks for candidates involves the employer or recruiter entering one or more search terms to manually create the query. A key challenge in talent searches is to translate the criteria of a hiring position into a search query that leads to desired candidates. To fulfill this goal, the searcher has to understand which skills are typically required for the position, what the alternatives are, which companies are likely to have such candidates, from which schools the candidates are most likely to have graduated, and so forth. Moreover, the knowledge varies over time. As a result, it is not surprising that even for experienced recruiters, it often requires many searching trials in order to obtain a satisfactory query.

One specific problem that can occur is that traditional querying typically involves utilizing keyword searching, and when multiple keywords are provided generally it is desirable to locate search results that contain any of the keywords in order to increase the likelihood that a desired result is obtained. This can in some instances, however, cause results that have little relevance to the original query to be retrieved, especially in the employment field. For example, a search on job listings for the terms "machine learning" may result in job listings involving construction (e.g., "will need to be familiar with how to operate heavy machines") as well as job listings involving education (e.g., "teacher needed for intensive learning school") that have nothing to do with the artificial intelligence "machine learning" that the searcher intended.

It is desirable to retrieve all documents that are relevant to a query (high recall) to allow users to explore as many relevant jobs as possible and/or allow recruiters to explore as many potential candidates as possible, but it is also desirable to retrieve only documents that are relevant to the query (high precision). Embarrassingly bad search results may show up in top positions of search results when the number of relevant results is low. Furthermore, because facets used by users to filter search results may be ranked by count, retrieval of large numbers of irrelevant jobs may cause facets presented to the searcher to be irrelevant as well.

BRIEF DESCRIPTION OF THE DRAWINGS

Some embodiments of the technology are illustrated, by way of example and not limitation, in the figures of the accompanying drawings.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a system is provided whereby entities are identified in a search query and standardized identifications for the entities are obtained. The standardized identifications may be stored in a standardized entity taxonomy. The query entities are then tagged with these standardized identifications. These standardized identifications can then be used to identify related entities in the standardized entity taxonomy. These related entities can be used for a variety of purposes, including query rewriting, result filtering, and result ranking. In an example embodiment, query rewriting is performed to restrict search results based on one or more rules provided for each type of entity in the query.

Via semantic query representation, the searcher's intent for the query can be determined. For example, the query "machine learning" is not just viewed as a series or even a sequence of keywords, but is instead recognized as a "skill" type entity in the taxonomy. By understanding the query at the entity level, it becomes possible to rewrite the query to only retrieve relevant results to the searcher's query, filtering out jobs that may have those keywords in the text but are completely illogical. In an example embodiment, only documents with a high semantic similarity with the query will be kept as search results.

Figure 1:
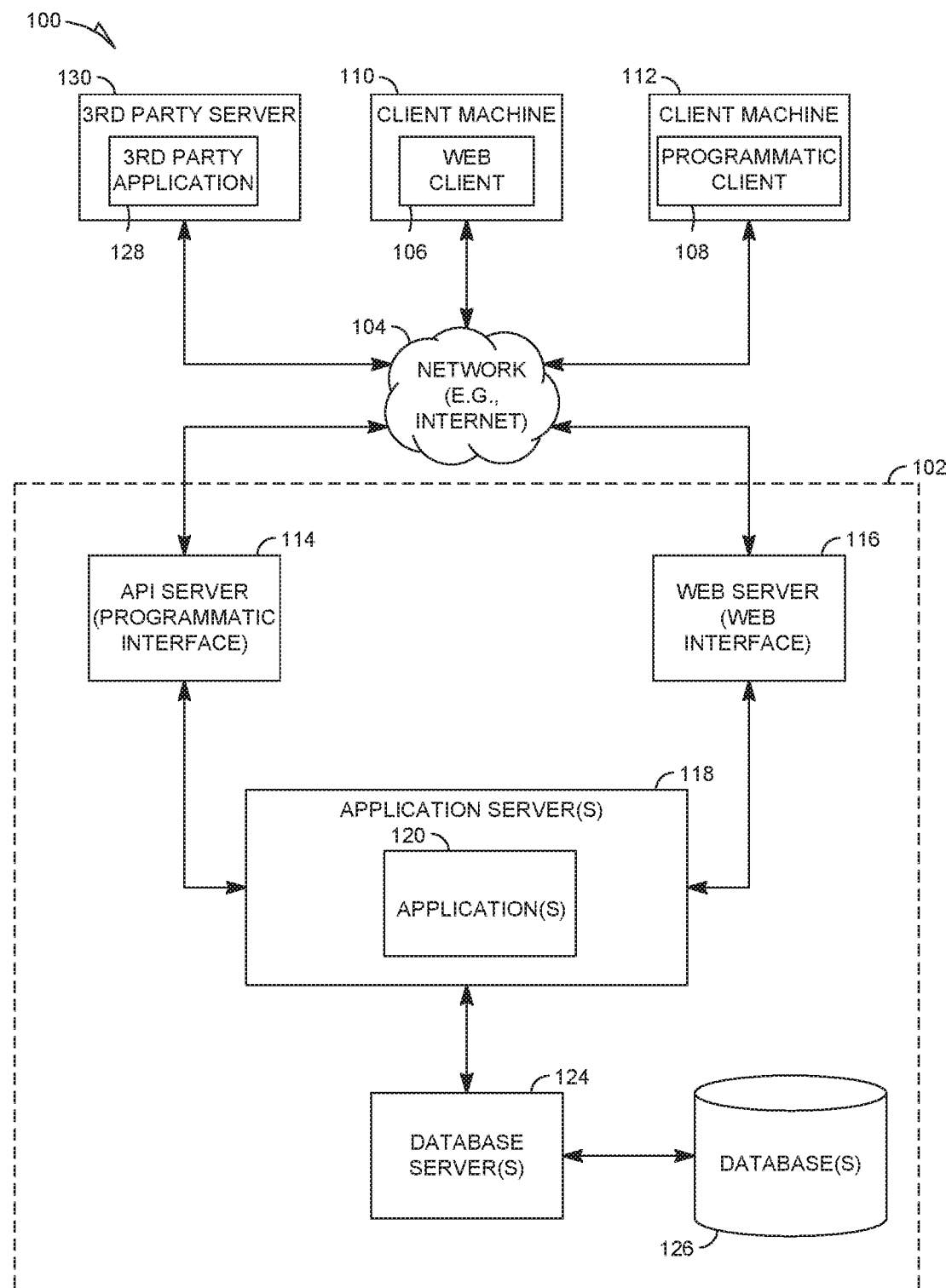
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
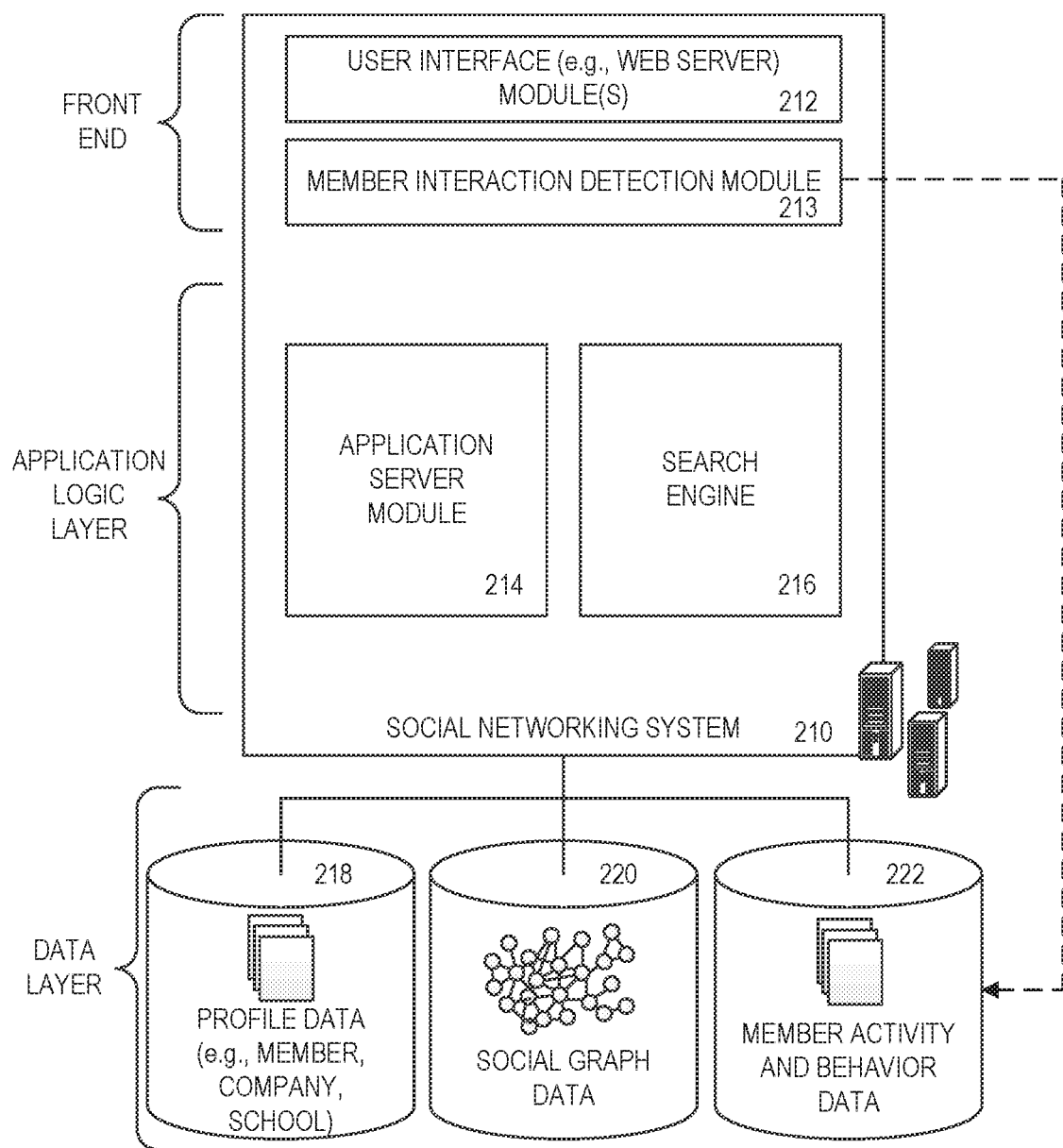
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with the different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member who is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application 120 may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
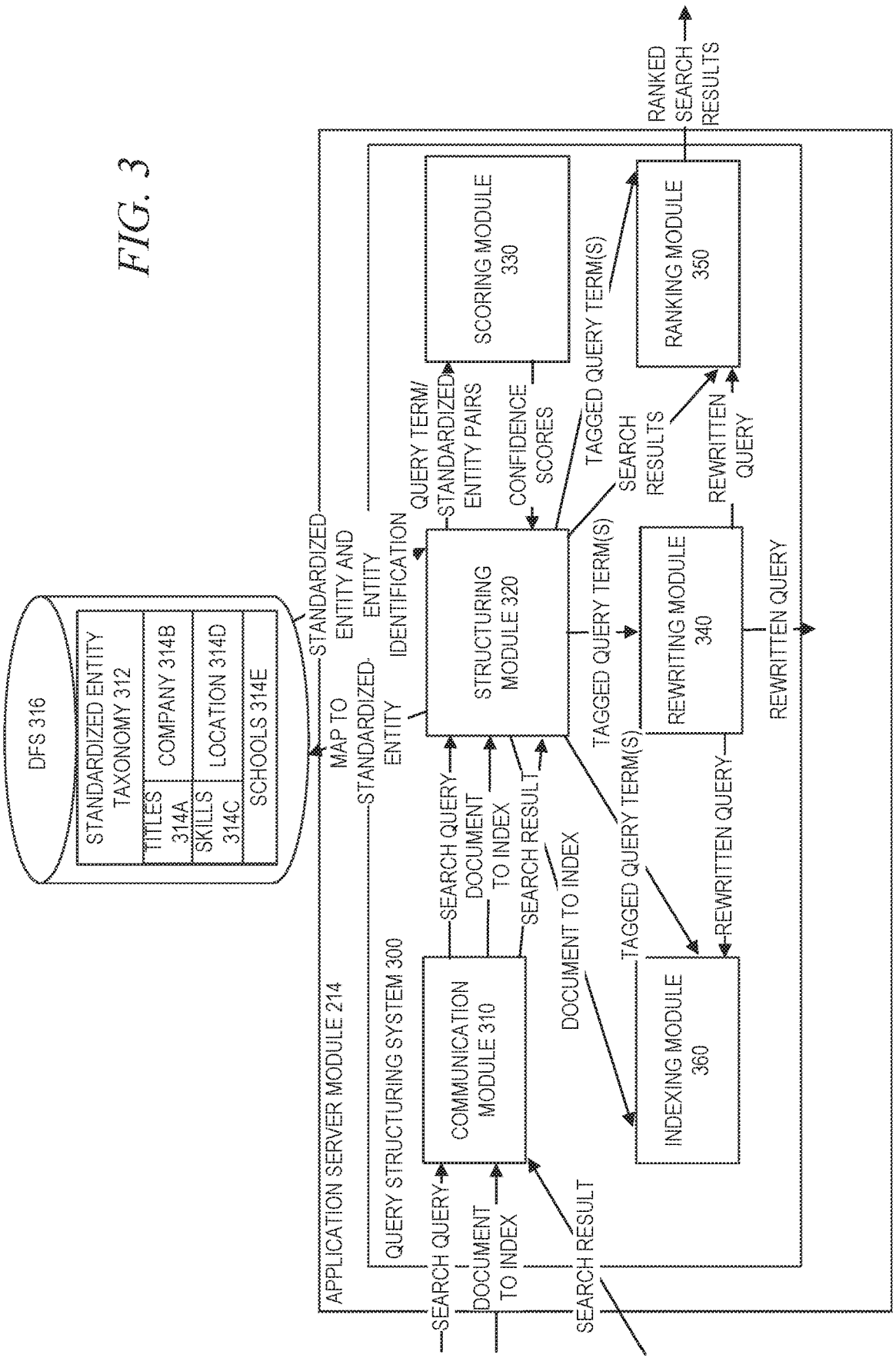
FIG. 3 is a block diagram illustrating an application server module in more detail, in accordance with an example embodiment.

FIG. 3 is a block diagram illustrating the application server module 214 of FIG. 2 in more detail. While in many embodiments the application server module 214 will contain many subcomponents used to perform various different actions within the social networking system 210, in FIG. 3 only those components that are relevant to the present disclosure are depicted. A query structuring system 300 includes a communication module 310, a structuring module 320, a scoring module 330, a rewriting module 340, a ranking module 350, and an indexing module 360.

The communication module 310 is configured to perform various communication functions to facilitate the functionality described herein. For example, the communication module 310 may communicate with users via the network 104 using a wired or wireless connection. The communication module 310 may also provide various web services functions such as retrieving information from the third-party servers 130 and the social networking system 210. In this way, the communication module 310 facilitates the communication of the query structuring system 300 with the client machines 110, 112 and the third-party servers 130 via the network 104. Information retrieved by the communication module 310 may include profile data corresponding to the user and other members of the social network service from the social networking system 210. As depicted, the communication module 310 is further configured to receive an input query to perform a search on information, including, but not limited to, member profiles. The input query may be received via a front-end interface, such as a web page rendered in a web browser or a dedicated client application. Regardless of how the input query is obtained, it can be passed to the structuring module 320 for further processing prior to the query being executed on whatever relevant database(s) can fulfill the query.

The structuring module 320 is configured to generate, from an input query, a tagged version of the query that includes information about standardized portions (called "entities") of the query. A standardized entity taxonomy 312 may be referenced during this process. The standardized entity taxonomy 312 may include an indication of various standardized entities and corresponding entity identifications (such as unique numbers corresponding to each entity). The standardized entity taxonomy 312 may include various portions devoted to different taxonomy categories, such as, for example, a titles portion 314A, a company portion 314B, a skills portion 314C, a location portion 314D, and a schools portion 314E. In other embodiments, each of these portions 314A-314E may be stored as its own independent taxonomy.

In some example embodiments, the standardized entity taxonomy 312 may comprise a data structure that includes different levels of a hierarchy, such as a tree graph. This allows some of the standardized entities to be parents or children of other standardized entities, reflecting a hierarchical relationship between them. For example, the titles of "software engineer" and "software developer" both may be children nodes of a higher-level title known as "computer scientist."

The standardized entity taxonomy 312 may be stored in, for example, a Distributed File System (DFS) 316.

The structuring module 320 may, for example, receive an input query of "software engineer," and map the term "software engineer" to the standardized term "Software Engineer" with a title identification (ID) (e.g., 21) within the standardized entity taxonomy 312. The entity "software engineer" in the query can then be tagged with this title ID (21). Additionally, a confidence score can be obtained for this title ID. This confidence score reflects the likelihood that a user having searched the term "software engineer" intended to search for the title of "Software Engineer." As will be described later, the confidence score may be generated by a confidence score model created through a machine learning algorithm. The entity in the query can also be tagged with this confidence score.

Thus, in various embodiments, the tagged query also encapsulates semantic ambiguity inherent within the input query. Within short queries, there is often not enough surrounding context to determine the correct choice when it comes to several interpretations of a single word. As will be seen, a query may eventually be modified to represent such ambiguities and synonyms by representing the query in all its possible interpretations. Each interpretation of an ambiguity is associated with a confidence score calculated by the scoring module 330, as discussed in further detail below.

The initial tagged query can be passed as input to various other modules, including the rewriting module 340 and the ranking module 350.

In the rewriting module 340, the tagged raw query may be augmented through various mechanisms. First, the initial tagging can be augmented by adding Boolean keywords, which will be useful when additional entities are added in a subsequent step. Thus, terms like "AND" and "OR" can be added to the query. At this point, additional entities can be added to the query based on confidence scores assigned to those additional entities, as generated using the standardized entities in the query. Thus, for example, if the query has been tagged with the standardized title ID of 21, then additional titles (e.g., "Software Developer" with a title ID 22) may also be added, if the confidence scores so indicate. Additionally, the standardized entities themselves can be added to the query.

Figure 4:
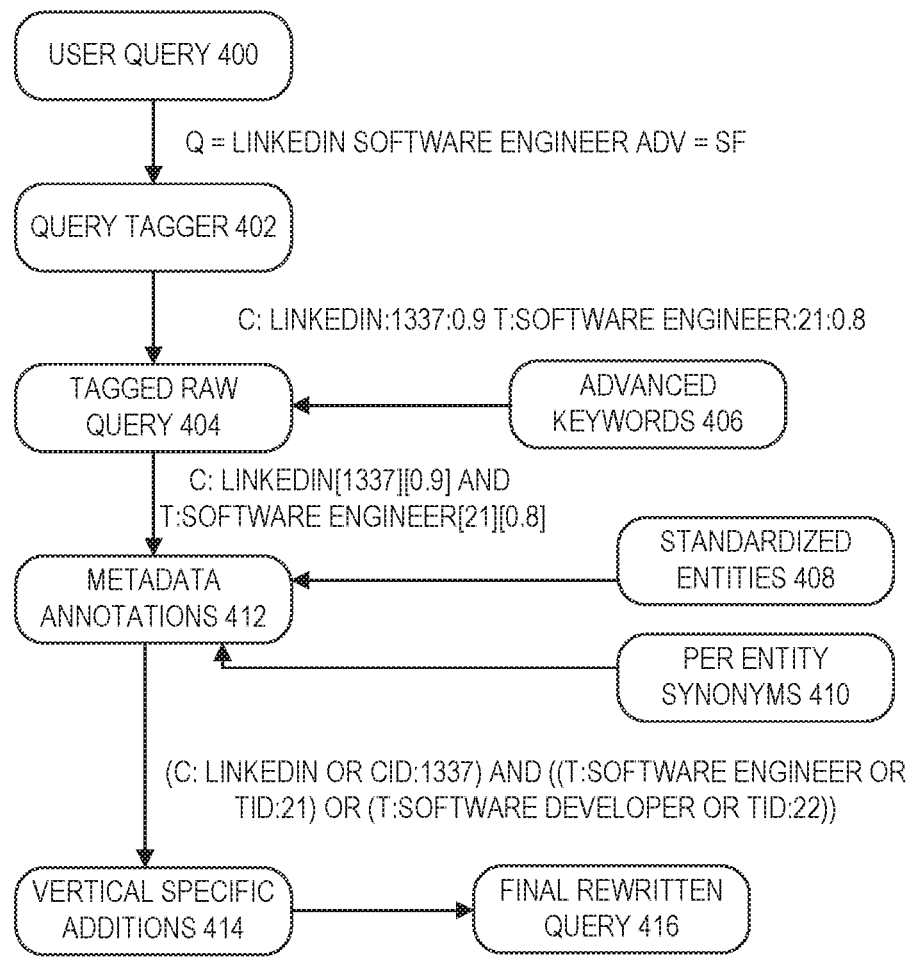
FIG. 4 is a diagram illustrating an example of the processes executed in a structuring module, in accordance with an example embodiment.

FIG. 4 is a diagram illustrating an example of the processes executed in the structuring module 320, in accordance with an example embodiment. Here, a user query 400 may be "linkedin software engineer." A query tagger 402 may then identify that "linkedin" bears a strong resemblance to a company entity in the company portion 314B of the standardized entity taxonomy 312 having a standardized company name of "LinkedIn," and the scoring module 330 calculates the confidence score as 0.9 (representing the likelihood that the user's typing of the term "linkedin" meant the standardized company name "LinkedIn"). The standardized company identification (1337) and the confidence score can then be tagged in the query. Likewise, the term "software engineer" in the query may be mapped to the standardized title "Software Engineer" in the title portion 314A of the standardized entity taxonomy 312. The standardized title identification for "Software Engineer" (21) and the confidence score (0.8) can be tagged to this term in the query. The result is a tagged raw query 404. It should be noted that the tagged raw query 404 may also include an indication of the entity type for each term, here depicted as "C" for company name and "T" for title. This may be helpful in the later execution of the query, as search results can be searched based on these entity types. Thus, for example, rather than looking in all fields of a search result for "linkedin," only the company name field may be searched, thereby reducing processing time.

Advanced keywords 406 can then be added to the tagged raw query 404 to introduce Boolean logic terms into the query. Here, for example, an AND may be added to the tagged raw query 404 in light of the fact that both the terms on either side of the AND were explicitly entered as search terms by the user.

Then standardized entities 408 and per entity synonyms 410 can be added as metadata annotations 412 to the tagged raw query 404. Standardized entities 408 are the identifications of the standardized entities added earlier. This step involves breaking out those identifications as independent search query terms and linking them to the original search query term via an OR connector. Per entity synonyms 410 include additional standardized entity names and identifications that have been previously identified as synonyms of query terms and/or standardized entities in the tagged raw query 404.

It should be noted that the confidence scores for each of the standardized entities added to the tagged raw query 404 can be used as part of the metadata annotations 412 process in order to decide whether to actually add each standardized entity identification to the tagged raw query 404. This may be accomplished using, for example, a confidence score threshold. Each confidence score can be compared to the threshold, and if the confidence score transgresses the threshold, then the corresponding standardized entity identification may be added as a metadata annotation 412.

Thus, in the example in FIG. 4, assume the confidence score threshold is 0.7. Since both 0.9 (for standardized company identification 1337) and 0.8 (for standardized title identification 21) transgress this threshold, both these identifications may be added to the tagged raw query 404. The result is the Boolean expression (C: LinkedIn OR Cid: 1337) AND ((T: Software Engineer OR Tid: 21) OR (T: Software Developer OR Tid: 22)). "Software Developer" is a predetermined synonym for "Software Engineer," and thus is added as a per entity synonym 410.

Then, various vertical specific additions 414 may be added to the query. Vertical specific additions allow for different granularities of a search term to be explored, based on the entity type. For example, a particular job title may be associated with various job functions. These job functions may be stored in the standardized entity taxonomy 312 as child nodes of the job title node. The rewriting module 340 may explore adding these child job functions as additional query terms based on confidence scores assigned to these child job functions (e.g., the likelihood that a user typing a specific title actually means specific job functions and does not mean other specific job functions).

Thus, for example, a search on the term "machine learning" may result in the determination that this term corresponds to a skill "machine learning" with a confidence score of 0.99 (lowest being 0.00 and highest being 1.00). The skill entity identification for "machine learning" in the standardized entity taxonomy 312 may be, for example, 217. As such, the query "machine learning" may be rewritten from "machine OR learning" to "(machine OR learning) OR standardizedSkills: 217)

As described earlier, the rewriting performed by the rewriting module 340 may additionally or alternatively include the addition of search terms or criteria to restrict the search results based on one or more rules corresponding to the entity types. In the above example, the query may be rewritten to "(machine OR learning) AND standardizedSkills: 217" in order to restrict the search results to only those results having the machine learning entity as a skill. The inclusion of the entity itself as part of the query, using an AND connector, is only one simple rule that can be implemented to rewrite the query based on the entity type(s) (here the rule being "include the standardized entity with the query using an AND connector"). Additional, more complex rules can also be specified for each entity type.

For example, the structuring module 320 may not be perfect when it comes to mapping query terms to skills. Recognizing this, an additional rule for skills entities may be check to see whether a phrase (i.e., more than one word) appears in the query and, if so, perform a keyword search for that phrase as a whole rather than as individual words. Thus, the query example above may be rewritten as "(machine OR learning) AND standardizedSkills: 217 AND jobBody: 'machine learning.'"

An additional rule that could be specified for skills entities is one that recognizes that there may be a correlation between titles and skills. Information on these correlations may be maintained in a taxonomy, and then used to obtain titles that have a high affinity with a particular skill. For example, a skill like machine learning would have a high title affinity with data scientists, software engineers, and the like. This information is then used to retrieve search results with a standardized title that has a high affinity with the query skill. If the search results' standardized title has a high affinity with the query skill, then this indicates that the keyword match was not a fluke. In an example embodiment, affinity scores are calculated using a g-score statistic. Specifically, a g-score statistic is calculated using a g-test of independence. A g-test is a likelihood ratio or maximum likelihood statistical significance test using a formula such as:

$$G = 2\sum_i O_i \cdot \ln\left(\frac{O_i}{E_i}\right)$$

where $O_i$ is the observed count, $E_i$ is the expected count under the null hypothesis, ln denotes the natural logarithm, and the sum is taken over all non-empty values.

Thus, for example, in the case of titles at a particular company, there are multiple title buckets for the company that are formed. For each bucket, all of the skills of these members are recorded and the number of members for each skill in each bucket is counted. For example, for the bucket "software engineer" at LinkedIn, with the skill Java, the number of members in this bucket having the skill Java is counted. Then the null hypothesis that Java is distributed randomly across different title/company buckets is assumed, meaning there is independence between Java as a skill and software engineers at LinkedIn (an alternative hypothesis being that there is a dependency). A contingency table for such an example is constructed as depicted in Table 1 below:

TABLE 1

| | Software Engineer @ LinkedIn | Not Software Engineer @ LinkedIn |
| --- | --- | --- |
| Have Java as Skill | 460 | 2280255 |
| Don't Have Java as Skill | 116 | 716523340 |

This table is then used to calculate the g-value using the above formula, which comes to 2630.745, meaning a high affinity between the skill and the job title. A threshold value may be utilized to determine whether or not a title has a high affinity with the skill, and if so, the standardized title may be added to the query along with the AND connector. Thus, the rule may be "determine if there are any standardized titles having an affinity score with the standardized skill higher than a preset threshold, and include any such standardized titles in the query with an AND connector." In the above example, the query may be rewritten as "(machine OR learning) AND standardizedSkills: 217 AND jobBody: 'machine learning' AND standardizedTitle: 9," where the standardized title "Software Engineer" has a title identification of 9.

An additional rule that could be specified for skills entities is one that recognizes that skills may be related to each other, and that this relation can be used to limit bare keyword searches. It should be noted that this rule likely would be used in conjunction with the rule above indicating that the standardized skill should be directly included in the query such that the skills are presented as connected with OR connectors, albeit in the context of all the skills being connected to the keyword search or other portions of the query with an AND connector. Thus, for example, if it is determined that the standardized skill of "data mining," having an identification of 835, is similar to the standardized skill of "machine learning," then the original query "(machine OR learning)" may be rewritten as "(machine OR learning) AND (standardizedSkills: 217 OR standardizedSkills: 835)"

Similarity between skills may be measured based on affinity scores calculated using pointwise mutual information (PMI). Assuming log base 2, a PMI value of 3 indicates that the probability of a second skill given a first skill is 8 times more likely than the probability of the second skill alone. The reverse is also true for PMI. In an example embodiment, a PMI value of 3 is used as the threshold at which the second skill is deemed to be similar enough to the first skill to be included in the query rewriting rule.

Skill affinity may be calculated by looking at all of the explicit skills in a member profile. Using all of the explicit skill data, the probability of each of the skills being present (number of members with the skill divided by total number of members) may be calculated. Additionally, each of the conditional probabilities p(skill1|skill2) (number of members with skill1 and skill2 divided by number of members with skill 2) may be calculated. With these probabilities, PMI may be calculated to derive the affinity score between skill1 and skill2.

The PMI of a pair of outcomes x and y belonging to discrete random variables X, Y, and Z quantifies the discrepancy between the probability of their coincidence given their joint distributions and their individual distributions, assuming independence. Mathematically this is:

$$pmi(x; y) \equiv \log\frac{p(x, y)}{p(x)p(y)} = \log\frac{p(x \mid y)}{p(x)} = \log\frac{p(y \mid z)}{p(y)}$$

As with skill entities, any title entities in the query may have the simple rule of inclusion of the standardized title in the query using an AND connector. Thus, a query of "engineering manager" could be rewritten as "(engineering OR manager) AND standardizedTitles: 174" (assuming that the standardized title "Engineering Manager" has an identification of 174 in the taxonomy).

An alternative rule may genericize the standardized title up to a standardized function level. Specifically, the taxonomy may be hierarchical, such that each generic function, such as Engineering, may be associated with multiple standardized titles. Thus, for the particular standardized title "Engineering Manager" the associated standardized function "Engineering" may be used, having an identification of 8. As such, the query may be rewritten to "(engineering OR manager) AND standardizedFunction: 8."

Additionally, as in the case of skills, the structuring module 320 may not be perfect when it comes to mapping query terms to titles. Unlike skills, however, which can occur anywhere in a search result, typically a dedicated text field is provided for title. For maximum recall, only a single token match may be needed for retrieval of job titles, but this can be extended to enforce phrase matching if higher precision is desired.

Of course, the query may be made up of multiple different types of entities. For example, the searcher may have searched on "engineering manager machine learning." The structuring module 320 is able to determine that this query is comprised of the different entities "engineering manager" and "machine learning" and rewrite the query in total using the different rules for the different entity types. The query may be rewritten as "((machine OR learning) AND (standardizedSkills: 217 OR standardizedSkills: 835)) OR ((engineering OR manager) AND standardizedFunction: 8)."

In some embodiments, the rewritten query is presented to the user and the user may alter the input query to clarify any ambiguity. In some embodiments, any clarification added by the user subsequent to the initial query is added to the existing generated data structure. For instance, if the user's initial query is "linkedin software engineer," then subsequently, after a search result is returned for that initial query, the user may add in the word "company," resulting in the second query "linkedin company software engineer" to clarify any ambiguity between the company "linkedin" and another type of entity called "linkedin," such as a skill.

The result of this entire process is a final rewritten query 416.

Referring back to FIG. 3, the rewritten query may then be passed from the structuring module 320 to a query processor (not pictured) that performs a search on the query and returns search results to the ranking module 350. While not pictured in FIG. 3, in some example embodiments, these communications may be passed through the communication module 310.

In various embodiments, the ranking module 350 is configured to rank documents retrieved in response to a search query in an order of relevance based on various factors, including, for example, the match of the input query to the information within a document, personal information within the member profile of the searcher or result, and/or information pertaining to the professional network of the searcher or result. Each factor that influences the ranking order of the retrieved documents has an associated predetermined weight, with the document scoring higher based on these predetermined weights being ranked higher. For example, first connections may be weighted more than second connections, and so forth, where a first connection refers to the user being directly connected to a second member profile. A second connection refers to the user being directly connected to another member's profile, who is then directly connected to the second member profile. In another example, member profiles that share similarities with the user's profile are weighted more than other member profiles that have fewer similarities.

In an example embodiment, the ranking module 350 uses a multipass scorer on results documents. At each pass, the search results are filtered and downgraded based on entity-based features from, for example, the tagged raw query 404 and/or the final rewritten query 416.

Another component that can utilize the standardized entity taxonomy 312 is the indexing module 360. Offline indexing can be used periodically to index new documents, profiles, and other information in the database. The standardized entity taxonomy 312 may be utilized during this indexing time to aid in the indexing process. For example, a process similar to query tagging can occur with various fields in the document. If a member profile, for example, lists a particular title that the member has entered for him or herself, then this profile may be indexed not just by the provided title, but by an identification of a mapped standardized title entity corresponding to that provided title, as well as by synonyms of or titles related to the provided title.

In some implementations, a presentation module (not pictured) is configured to present query rewriting recommendations to the user, present search results according to their ranked order, present a reason associated with why the query result is being presented (e.g., such as a shared connection), and present the search results with category-selected highlighting. In some embodiments, where there are ambiguities associated with a word, the interpretation associated with retrieving a result is shown to the user. In various implementations, the presentation module presents or causes presentation of information (e.g., information visually displayed on a screen, acoustic output, haptic feedback). Interactively presenting information is intended to include the exchange of information between a particular device and the user of that device. The user of the device may provide input to interact with a user interface in many possible manners, such as alphanumeric input, point based (e.g., cursor) input, tactile input, or other input (e.g., touch screen, tactile sensor, light sensor, infrared sensor, biometric sensor, microphone, gyroscope, accelerometer, or other sensors), and the like. It will be appreciated that the presentation module provides many other user interfaces to facilitate functionality described herein. Further, it will be appreciated that "presenting" as used herein is intended to include communicating information or instructions to a particular device that is operable to perform presentation based on the communicated information or instructions via the communication module 310, structuring module 320, scoring module 330, rewriting module 340, ranking module 350, and indexing module 360.

As described earlier, the scoring module 330 is configured to determine a confidence score associated with each possible entity of the input query. An input query may have inherent semantic ambiguities and synonyms associated with some of the key words within the query. The confidence score indicates the accuracy with which the system maps each term to a corresponding standardized entity, based on the likelihood that the searcher, under ideal circumstances, would have specified the standardized entity in the query.

In an example embodiment, the confidence score is calculated based on machine learning models of two types of training data sets, including past activities of all members from the member activity and behavior database 222 and the profile data of all members from the profile database 218. The confidence score is calculated based on member activity data indicating a percentage of member activity associating the word term to the corresponding standardized entity. For instance, member activities and behavior include statistics showing when users type in the same word terms as an input query and the corresponding frequency with which the users then click on search results with one of the interpretations of the known ambiguity. Continuing with the previous example, when users input a search query with the word term "linkedin," the scoring module 330 determines that 70% of the time, the users then click on search results that specify LinkedIn as the company rather than, for example, LinkedIn as a skill or location. In this instance, the confidence score of assigning the category "company" to the word term "linkedin" is 0.7

In other embodiments, in determining the confidence score associated with assigning a word term within an input query to a specific standardized entity, the scoring module 330 uses profile data of members obtained from the profile database 218. The confidence score is calculated based on member profile data indicating a percentage of member profile data associating the word term to the corresponding standardized entity. For instance, statistics are determined from member profiles in order to determine the category in which the word term can be found. Continuing with the previous example, the scoring module 330 determines that 0.001% of the profiles within the profile database 218 indicate that LinkedIn is a skill set. In this instance, the confidence score of mapping the query term "linkedin" to a skill of "LinkedIn" is 0.001.

In other embodiments, the confidence score is calculated based on both member activity data and member profile data.

Figure 5:
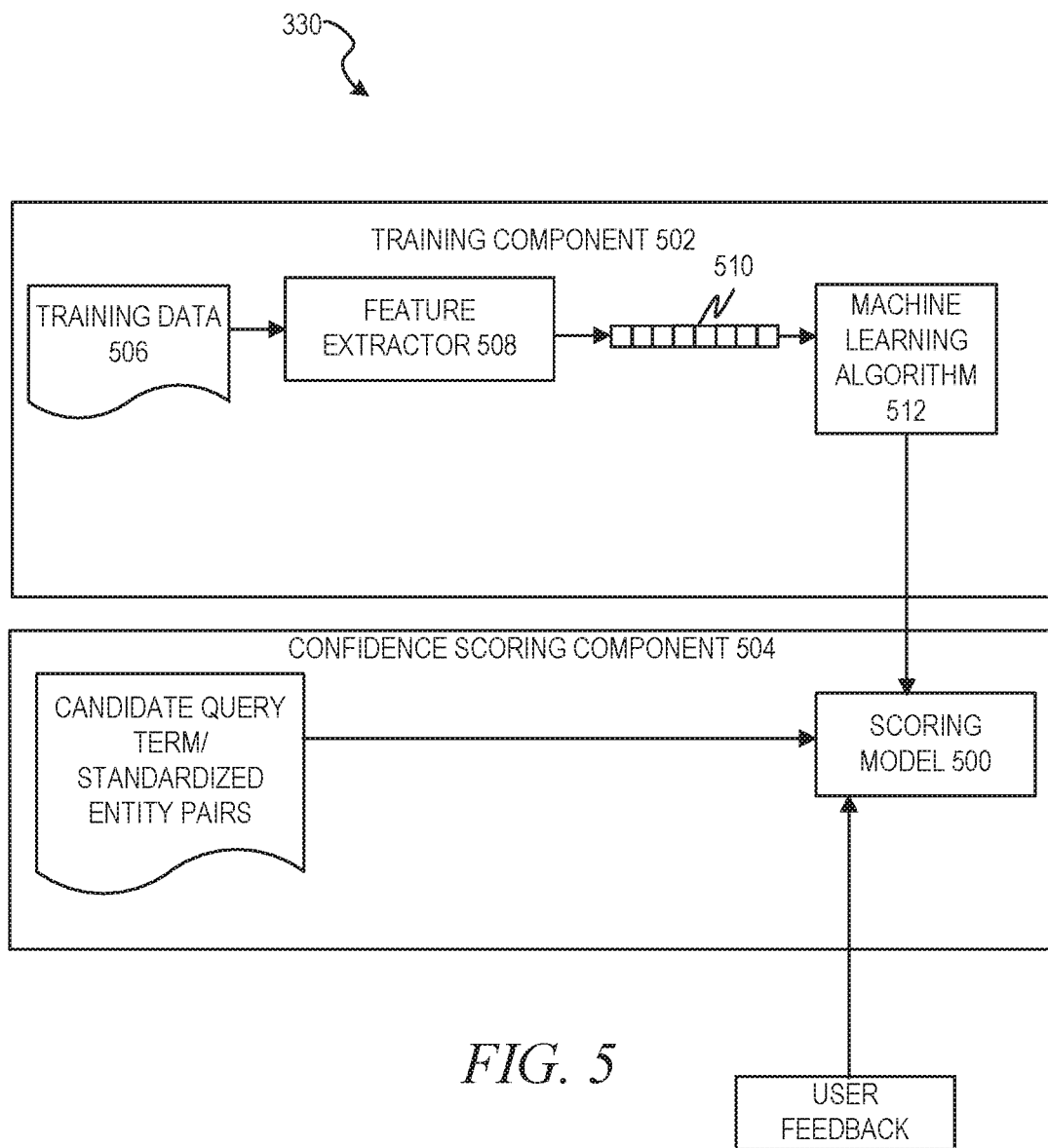
FIG. 5 is a block diagram illustrating a scoring module in more detail, in accordance with an example embodiment.

FIG. 5 is a block diagram illustrating a scoring module 330 in more detail, in accordance with an example embodiment. The scoring module 330 may utilize machine learning processes to arrive at a scoring model 500 used to provide a confidence score for a particular query term-standardized entity pair. The scoring module 330 may comprise a training component 502 and a confidence scoring component 504. The training component 502 feeds training data 506 comprising, for example, member profile data and member activity data into a feature extractor 508 that extracts one or more features 510 of the information. The features 510 are statistical measurements useful in determining whether a member searching on a particular query term actually meant to search on the particular standardized entity being analyzed. A machine learning algorithm 512 produces the scoring model 500 using the extracted features 510. In the confidence scoring component 504, candidate query term-standardized entity pairs are fed to the scoring model 500, which outputs a confidence score for each pair based on the scoring model 500.

It should be noted that the scoring model 500 may be periodically updated via additional training and/or user feedback. The user feedback may be either feedback from members performing searches or from administrators. The feedback may include an indication about how successful the scoring model 500 is in providing accurate confidence scores.

The machine learning algorithm 512 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, a multi-class logistical regression model is used.

As described above, the training component 502 may operate in an offline manner to train the scoring model 500. The confidence scoring component 504, however, may be designed to operate in either an offline manner or an online manner.

Figure 6:
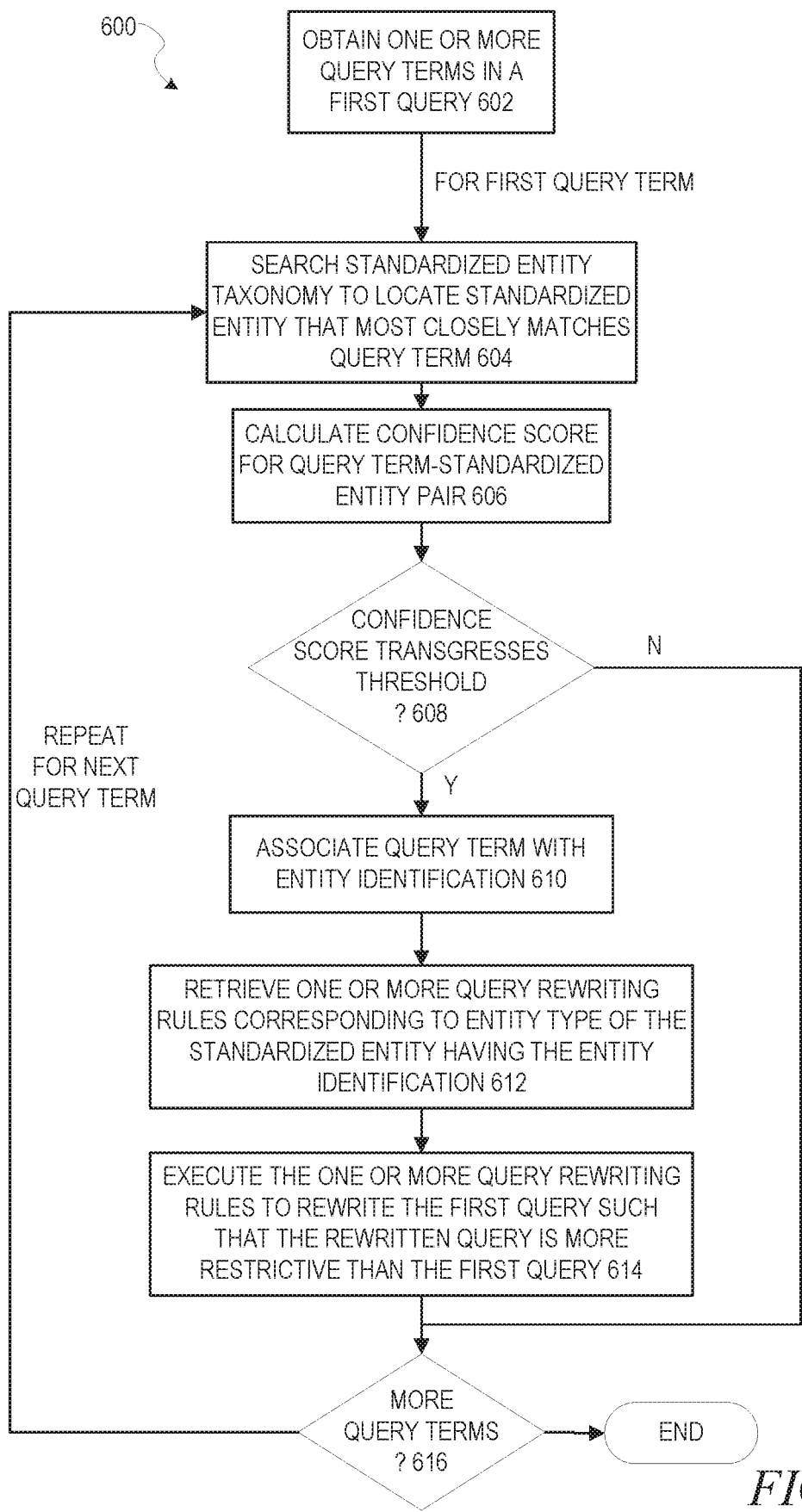
FIG. 6 is a flow diagram illustrating a method for using a standardized entity taxonomy for query rewriting, in accordance with an example embodiment.

FIG. 6 is a flow diagram illustrating a method 600 for using a standardized entity taxonomy for query rewriting, in accordance with an example embodiment. At operation 602, one or more query terms in a first query are obtained. These query terms may be obtained, for example, as part of a search query entered by a member of a social networking service. Then a loop is begun for each of the one or more query terms. At operation 604, a standardized entity taxonomy is searched to locate a standardized entity that most closely matches the query term. Then, at operation 606, a confidence score is calculated for the query term-standardized entity pair for the standardized entity that most closely matches the query term. Then, at operation 608, it is determined if the confidence score transgresses a threshold. If not, then the method 600 may advance to operation 616. If so, however, then the method 600 proceeds to operation 610

At operation 610, the query term is associated with the entity identification. At operation 612, one or more query rewriting rules corresponding to the entity type of the standardized entity having the entity identification are retrieved. At operation 614, the one or more query rewriting rules are executed to rewrite the first query such that rewritten query is more restrictive than the first query (i.e., the rewritten query, when performed on a data source, returns fewer search results than the first query would have on the same data source).

At operation 616, it may be determined if there are any more query terms. If so, then the method 600 loops back to operation 604 for the next query term. If not, then the method 600 ends. It should be noted that while a specific ordering of operations within the loop is presented in this figure, alterations of this figure are possible where multiple loops are performed independently. For example, operations 604-608 may be performed for each query term, and then operations 610-614 may be performed in a separate loop for each query term.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-6 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 7:
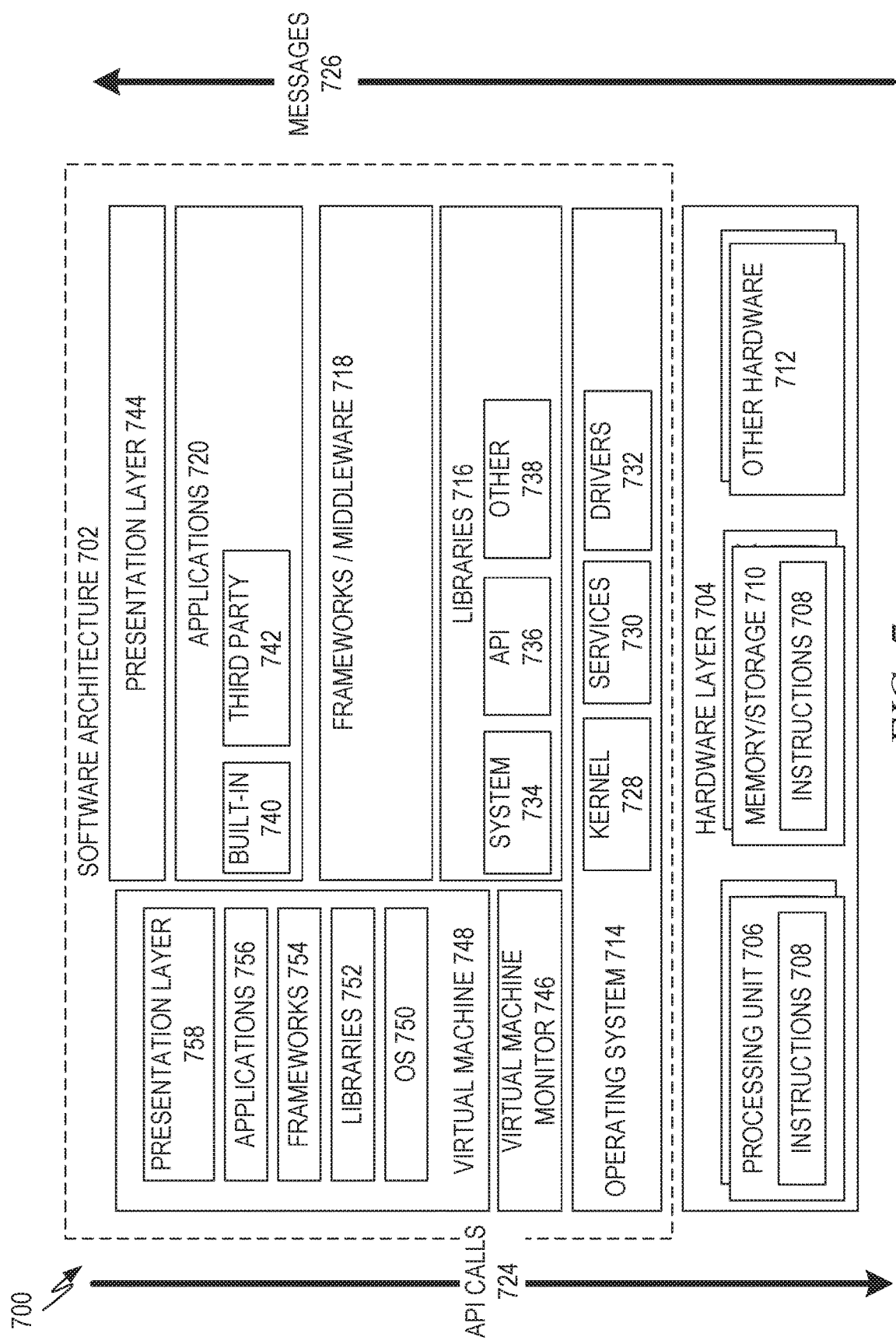
FIG. 7 is a block diagram illustrating a representative software architecture, which may be used in conjunction with various hardware architectures herein described.

FIG. 7 is a block diagram 700 illustrating a representative software architecture 702, which may be used in conjunction with various hardware architectures herein described. FIG. 7 is merely a non-limiting example of a software architecture, and it will be appreciated that many other architectures may be implemented to facilitate the functionality described herein. The software architecture 702 may be executing on hardware such as a machine 800 of FIG. 8 that includes, among other things, processors 810, memory/storage 830, and I/O components 850. A representative hardware layer 704 is illustrated and can represent, for example, the machine 800 of FIG. 8. The representative hardware layer 704 comprises one or more processing units 706 having associated executable instructions 708. The executable instructions 708 represent the executable instructions of the software architecture 702, including implementation of the methods, modules, and so forth of FIGS. 1-6. The hardware layer 704 also includes memory and/or storage modules 710, which also have the executable instructions 708. The hardware layer 704 may also comprise other hardware 712, which represents any other hardware of the hardware layer 704, such as the other hardware illustrated as part of the machine 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720, and a presentation layer 744. Operationally, the applications 720 and/or other components within the layers may invoke API calls 724 through the software stack and receive responses, returned values, and so forth, illustrated as messages 726, in response to the API calls 724. The layers illustrated are representative in nature and not all software architectures have all layers. For example, some mobile or special-purpose operating systems may not provide a layer of frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than by interfacing directly with the underlying operating system 714 functionality (e.g., kernel 728, services 730, and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 and/or other software components/modules. For example, the frameworks 718 may provide various graphic user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. The third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 742 may invoke the API calls 724 provided by the mobile operating system such as the operating system 714 to facilitate functionality described herein.

The applications 720 may utilize built-in operating system 714 functions (e.g., kernel 728, services 730, and/or drivers 732), libraries 716 (e.g., system libraries 734, API libraries 736, and other libraries 738), and frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures utilize virtual machines. In the example of FIG. 7, this is illustrated by a virtual machine 748. A virtual machine creates a software environment where applications/modules can execute as if they were executing on a hardware machine (such as the machine 800 of FIG. 8, for example). A virtual machine is hosted by a host operating system (e.g., operating system 714 in FIG. 7) and typically, although not always, has a virtual machine monitor 746, which manages the operation of the virtual machine 748 as well as the interface with the host operating system (e.g., operating system 714). A software architecture executes within the virtual machine 748, such as an operating system 750, libraries 752, frameworks/middleware 754, applications 756, and/or a presentation layer 758. These layers of software architecture executing within the virtual machine 748 can be the same as corresponding layers previously described or may be different.

Example Machine Architecture and Machine-Readable Medium

Figure 8:
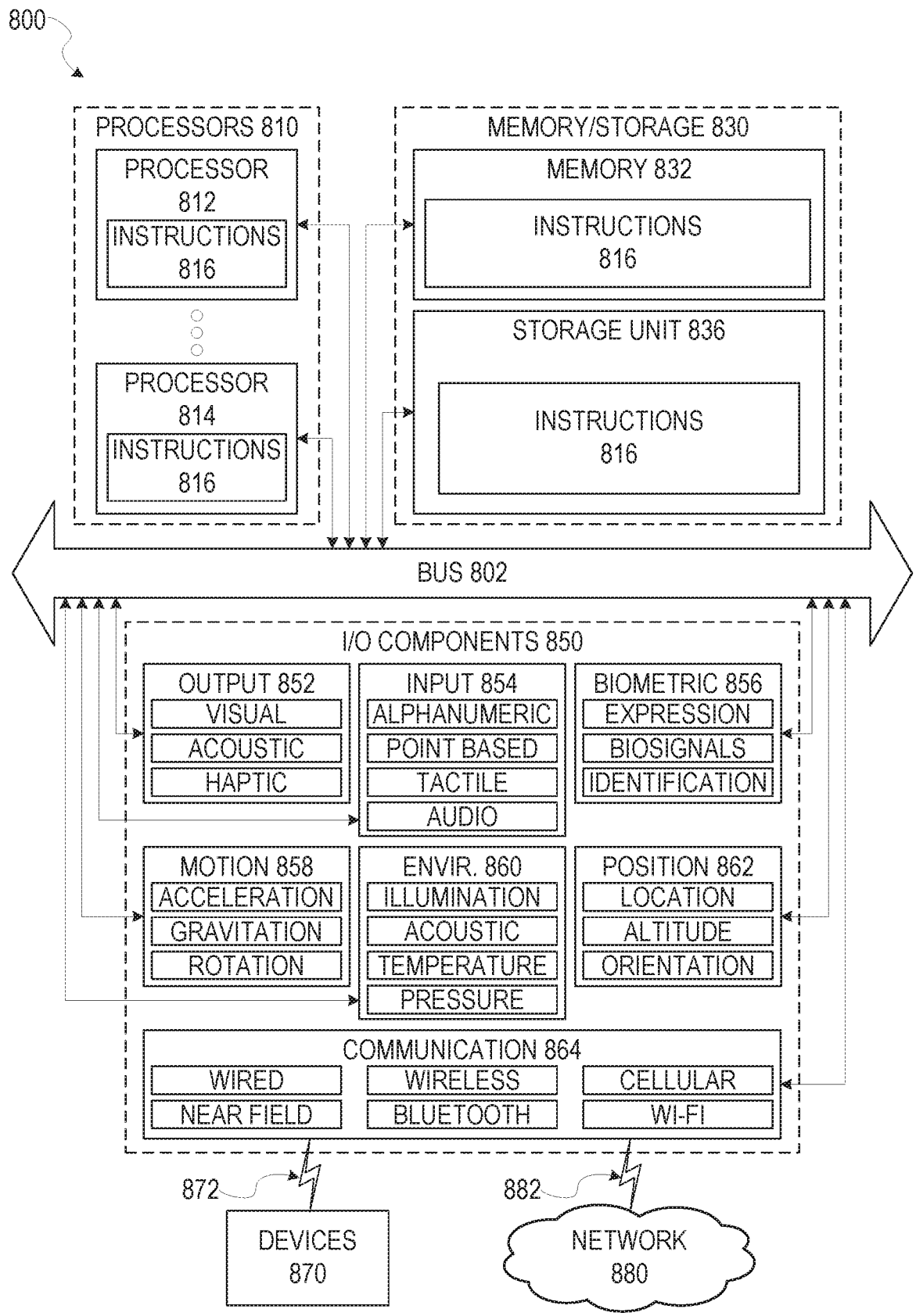
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. The instructions 816 transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory/storage 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of the processors 810 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine (e.g., processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or other suitable device to interface with the network 880. In further examples, the communication components 864 may include wired communication components, wireless communication components, cellular communication components, Near Field Communication (NFC) components. Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., HTTP). Similarly, the instructions 816 may be transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method, comprising:
obtaining one or more query terms in a first query; and
for each of the one or more query terms:
searching a standardized entity taxonomy to locate a standardized entity that most closely matches the query term, the standardized entity taxonomy comprising an entity identification for each of a plurality of different standardized entities;
calculating a confidence score for a query term-standardized entity pair for the standardized entity that most closely matches the query term;
in response to a determination that the confidence score transgresses a threshold, associating the query term with the entity identification corresponding to the standardized entity that most closely matches the query term;
rewriting the first query, based on the entity type of the standardized entity having the identity identification, such that the rewritten query is more restrictive than the first query; and
causing a database search to be performed using the rewritten query, producing search results.

2. The method of claim 1, wherein the rewriting includes adding the standardized entity having the entity identification to the first query with an AND connector.

3. The method of claim 1, wherein the rewriting includes determining if the query term comprises two or more words and, in response to a determination that the query term comprises two or more words, adding the two or more words as a phrase to the first query with an AND connector.

4. The method of claim 1, wherein the entity type is a skill and the rewriting includes determining if there are any standardized titles having an affinity score with the standardized entity that most closely matches the query term higher than a preset threshold, and adding any such standardized titles to the first query with an AND connector.

5. The method of claim 2, wherein the entity type is a skill and the rewriting includes determining if there are any skills similar to the standardized entity having the entity identification, and adding any such similar skills to the standardized entity having the entity identification to the first query with an OR connector.

6. The method of claim 1, wherein the entity type is a skill and the rewriting includes identifying a standardized function corresponding to the standardized entity having the entity identification in the standardized entity taxonomy and adding the standardized function to the first query with an AND connector.

7. The method of claim 1, wherein the confidence score indicates a statistical likelihood that a user specifying the query term in a search query would have, under ideal circumstances, also entered the corresponding standardized entity in the search query, based on a confidence score model trained via a machine learning algorithm based on member profiles and member activities in a social networking service.

8. A system comprising:
a computer-readable medium having instructions stored thereon, which, when executed by a processor, cause the system to:
obtain one or more query terms in a first query; and
for each of the one or more query terms:
search a standardized entity taxonomy to locate a standardized entity that most closely matches the query term, the standardized entity taxonomy comprising an entity identification for each of a plurality of different standardized entities;
calculate a confidence score for a query term-standardized entity pair for the standardized entity that most closely matches the query term;
in response to a determination that the confidence score transgresses a threshold, associate the query term with the entity identification corresponding to the standardized entity that most closely matches the query term;
rewrite the first query, based on the entity type of the standardized entity having the identity identification, such that the rewritten query is more restrictive than the first query; and
cause a database search to be performed using the rewritten query, producing search results.

9. The system of claim 8, wherein the rewriting includes adding the standardized entity having the entity identification to the first query with an AND connector.

10. The system of claim 8, wherein the rewriting includes determining if the query term comprises two or more words and, in response to a determination that the query term comprises two or more words, adding the two or more words as a phrase to the first query with an AND connector.

11. The system of claim 8, wherein the entity type is a skill and the rewriting includes determining if there are any standardized titles having an affinity score with the standardized entity that most closely matches the query term higher than a preset threshold, and adding any such standardized titles to the first query with an AND connector.

12. The system of claim 9, wherein the entity type is a skill and the rewriting includes determining if there are any skills similar to the standardized entity having the entity identification, and adding any such similar skills to the standardized entity having the entity identification to the first query with an OR connector.

13. The system of claim 8, wherein the entity type is a skill and the rewriting includes identifying a standardized function corresponding to the standardized entity having the entity identification in the standardized entity taxonomy and adding the standardized function to the first query with an AND connector.

14. The system of claim 8, wherein the confidence score indicates a statistical likelihood that a user specifying the query term in a search query would have, under ideal circumstances, also entered the corresponding standardized entity in the search query, based on a confidence score model trained via a machine learning algorithm based on member profiles and member activities in a social networking service.

15. A non-transitory machine-readable storage medium comprising instructions, which when implemented by one or more machines, cause the one or more machines to perform operations comprising:
obtaining one or more query terms in a first query; and
for each of the one or more query terms:
searching a standardized entity taxonomy to locate a standardized entity that most closely, matches the query term, the standardized entity taxonomy comprising an entity identification for each of a plurality of different standardized entities;

calculating a confidence score for a query term-standardized entity pair for the standardized entity that most closely matches the query term;

in response to a determination that the confidence score transgresses a threshold, associating the query term with the entity identification corresponding to the standardized entity that most closely matches the query term;

rewriting the first query, based on the entity type of the standardized entity having the identity identification, such that the rewritten query is more restrictive than the first query; and causing a database search to be performed using the rewritten query, producing search results.

16. The non-transitory machine-readable storage medium of claim 15, wherein the rewriting includes adding the standardized entity having the entity identification to the first query with an AND connector.

17. The non-transitory machine-readable storage medium of claim 15, wherein the rewriting includes determining if the query term comprises two or more words and, in response to a determination that the query term comprises two or more words, adding the two or more words as a phrase to the first query with an AND connector.

18. The non-transitory machine-readable storage medium of claim 15, wherein the entity type is a skill and the rewriting includes determining if there are any standardized titles having an affinity score with the standardized entity that most closely matches the query term higher than a preset threshold, and adding any such standardized titles to the first query with an AND connector.

19. The non-transitory machine-readable storage medium of claim 16, wherein the entity type is a skill and the rewriting includes determining if there are any skills similar to the standardized entity having the entity, identification, and adding any such similar skills to the standardized entity having the entity identification to the first query with an OR connector.

20. The non-transitory machine-readable storage medium of claim 15, wherein the entity type is a skill and the rewriting includes identifying a standardized function corresponding to the standardized entity having the entity identification in the standardized entity taxonomy and adding the standardized function to the first query with an AND connector.

* * * * *

UNITED STATES PATENT AND TRADEMARK OFFICE
CERTIFICATE OF CORRECTION

PATENT NO. : 10,956,414 B2  
APPLICATION NO. : 16/058548  
DATED : March 23, 2021  
INVENTOR(S) : Le et al.

Page 1 of 1

It is certified that error appears in the above-identified patent and that said Letters Patent is hereby corrected as shown below:

In the Claims

In Column 24, Line 64, in Claim 15, delete "closely," and insert --closely-- therefor In Column 26, Line 11, in Claim 19, delete "entity," and insert --entity-- therefor Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*